United States Patent [19]

Nicholls

[11] Patent Number: 4,778,718

[45] Date of Patent: Oct. 18, 1988

[54] FABRIC-REINFORCED CEMENTITIOUS SHEET-LIKE STRUCTURES AND THEIR PRODUCTION

[75] Inventor: Robert L. Nicholls, Newark, Del.

[73] Assignee: University of Delaware, Newark, Del.

[21] Appl. No.: 30,410

[22] Filed: Mar. 26, 1987

[51] Int. Cl.[4] .......................... B32B 27/34; B28B 3/00
[52] U.S. Cl. .................................... 428/287; 106/99;
264/257; 264/333; 428/289; 428/454; 428/483;
428/516; 428/703
[58] Field of Search ............... 428/703, 283, 287, 454,
428/483, 516, 289; 106/99; 264/333, 257;
156/42

[56] References Cited

U.S. PATENT DOCUMENTS

| 4,159,361 | 6/1979 | Schupack | 264/257 |
| 4,446,083 | 5/1984 | Nicholls | 264/333 |
| 4,528,238 | 7/1985 | Alford | 428/703 |
| 4,617,219 | 10/1986 | Schupack | 428/703 |

FOREIGN PATENT DOCUMENTS

| 0073216 | 6/1978 | Japan | 428/703 |
| 0188516 | 9/1985 | Japan | 428/703 |

Primary Examiner—George F. Lesmes
Assistant Examiner—J. Monroe
Attorney, Agent, or Firm—James H. Ryan

[57] ABSTRACT

A bendable thin, sheet-like structure having a cementitious matrix reinforced with a three-dimensional fabric of an organic fiber uniformly distributed throughout the thickness of the structure and a continuous process for its production.

10 Claims, 2 Drawing Sheets

FABRIC-REINFORCED CEMENTITIOUS SHEET-LIKE STRUCTURES AND THEIR PRODUCTION

BACKGROUND

For many years sheet-like cementitious products containing high tensile modulus fibrous reinforcements, such as asbestos, have been produced to increase tensile strength and modulus. Such reinforced products were made by mixing the reinforcement with a cement composition and water to form a viscous slurry which was cast or molded to form the desired rigid shape.

The resulting reinforced products, however, were prone to crack upon application of slight bending forces or light impact, such as nailing or shipping and handling.

Recently, sheet-like cementitious products with ductile organic fiber reinfocements provided improvements in the products and in production processes. Improvements in products resulted from investigations of the role of composition and physical form of matrix material and reinforcements on properties. Insufficient investigation was directed, however, to possible damaging effects of production steps on final properties. Also, development of effective continuous processes received little attention.

In the prior art disclosures, Alford, in U.S. Pat. No. 4,528,238, July 9, 1985, discloses a method of making a structure with a fiber-reinforced, moldable, cementitious composition by mixing a viscous cement matrix mixture and a water-insoluble fibrous material, in which water is present in the matrix material at not more than 25 percent of the total weight of the cement. The teaching is directed to mixing a viscous slurry of cement into which the fiber is pressed.

Schupack, in U.S. Pat. No. 4,617,219, Oct. 14, 1986, discloses products with randomly oriented, organic fibrous reinforcements in a cement matrix, the product being produced by pressing the fabric into the slurry, either in molding trays or by a continuous basis on rolls. The patent discloses that the degree to which panels can be bent depends upon a number of factors, principally on thickness. Low-radius bending is achieved with very fine cracks which depend upon proper fabric choice.

Currie, et al., in U.S. Pat. No. 4,578,301, Mar. 25, 1986, disclose a composite structure of a water-hardened cement matrix reinforced with layers of parallel fiber strands, the structure being formed by forcing a cement slurry into the strands.

Tesch, in U.S. Pat. No. 4,495,235, July 17, 1985, discloses a process of laying wet cement between two fabric layers followed by needling the fabric layers together through the cement before the cement sets.

Nicholls, in U.S. Pat. No. 4,446,083, May 1, 1984, discloses a method of construction of a cement roof or enclosure by a sequence involving first spreading a layer of dry cement-aggregate mix on a fabric which is then supported on an inflated membrane and thereafter adding water. This method is adapted to in situ formation of a rigid, curved, concrete roof structure.

The foregoing disclosures as well as similar disclosures in several foreign patent publications are indicative of advances in the art which occurred in recent work on ductile reinforcements. A conclusion to be drawn from this work is that a difference exists between the roles of rigid, non-ductile reinforcements in plastic matrices and that of ductile reinforcements in rigid matrices. The former role relies upon the added strength of the reinforcement. The latter role is reinforcement to cushion and dissipate applied compressive and tensile stresses. Ductile reinforcements prevent major crack formation caused by bending, tension, and compression, including impact.

OBJECTS OF THE INVENTION

In view of the foregoing, an object of the invention is to provide a sheet-like cementitious structure reinforced with a fabric of ductile fibers, the reinforced structure having a high resistance to formation of major cracks upon application of bending forces or light impact.

It is another object of the invention to provide a sheet-like cementitious structure reinforced with a fabric of ductile fibers, the structure having a high resistance to formation of major cracks upon bending and impact, which is adapted to production on a continuous basis.

It is yet another object to provide a continuous process for production of crack-resistant, reinforced cementitious products on a continuous basis.

It is still another object of the invention to provide reinforced cementitious sheets useful for building applications such a shingles and tile roofing, faces for structural sandwich panels, corrugated board, and folded plate structural assemblies.

These and other objects as well as advantages of the invention can be understood from the summary of the invention, the drawings, and the description and claims which follow.

SUMMARY OF THE INVENTION

Objects of the invention are satisfied by a thin, sheet-like cementitious structure which is reinforced with a three-dimensional fabric of a ductile organic fiber, the fabric distributed substantially uniformly throughout the thickness of the structure.

A preferred embodiment of the invention is a reinforced sheet-like cementitious structure having a continuous sheet of a flexible organic film forming a backing layer;

a substantially uniformly thick cementitious matrix layer on the backing layer; and a three-dimensional fabric of ductile fibers extending throughout the matrix at a ratio of fabric volume to total volume equal to or greater than the critical volume ratio at which the tensile strength of the reinforced structure exceeds that of the matrix above.

Further objects of the invention are satisfied by a process for continuous production of a fabric-reinforced, sheet-like structure by a sequence of steps which includes pulling a film-backed fabric from a supply past a source of a dry, matrix-forming cement blend which is deposited at a controlled rate on the fabric and is then wetted at a controlled rate by water from an adjustable spray.

DESCRIPTION OF THE INVENTION

Figure 1:
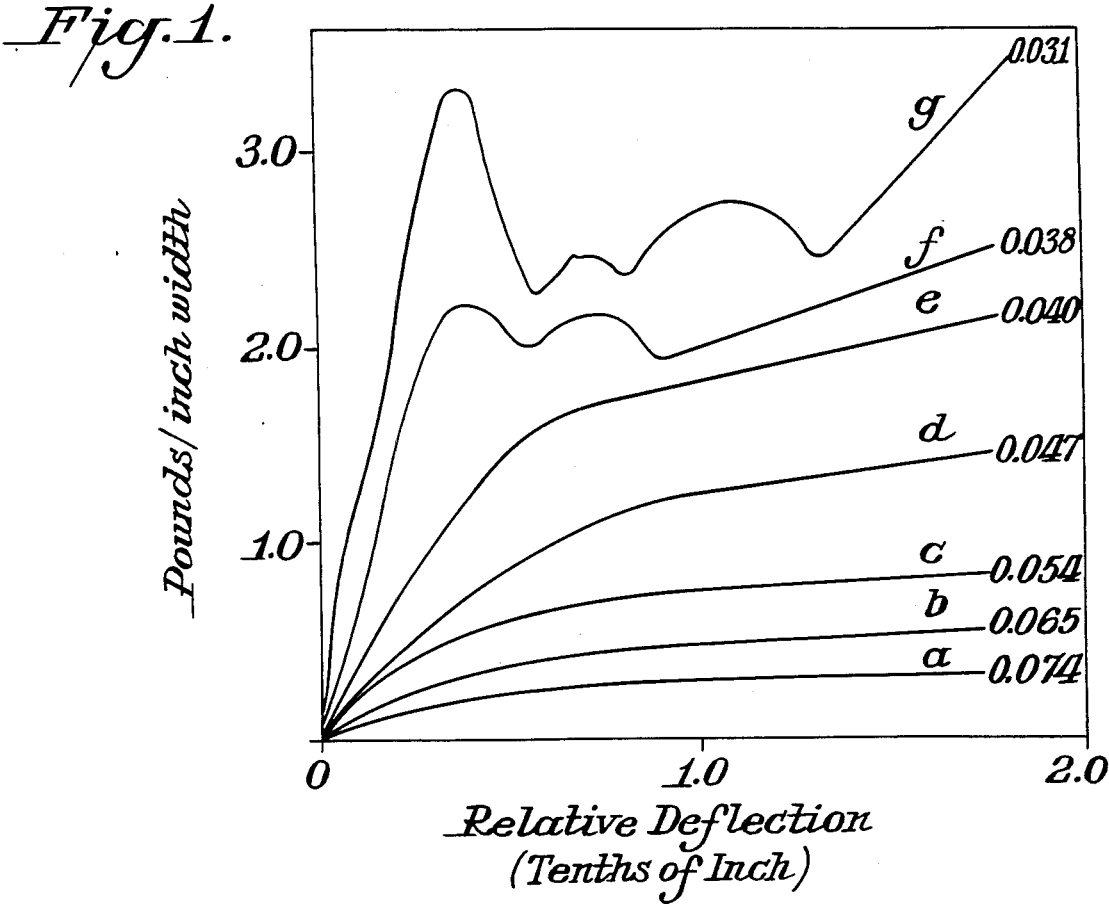
FIG. 1 illustrates the relationship of deflection in a three-point bending test of fabric-reinforced cement sheets as a function of the ratio of the volume of reinforcing fabric to that of the total reinforced structure.

Evaluation of the teachings of prior art, as typified by the foregoing, in the production of reinforced sheet-like structures revealed a need to reconsider the factors involved. In the instant invention, selected factors such as compositions of the matrix and reinforcement, the structure of the reinforcement and its distribution in the matrix, the mechanics and modes of failure and production variables and methods were considered. With the large number of actors to be considered, all combinations could not be exhaustively tested, but for the most part, each was optimized with numerous tests to evaluate possible interactions. The results of these studies enabled several generalities to be drawn which serve as guidelines in development of thin, sheet-like reinforced products, and a process for their production.

A composition suitable for an economic continuous process should have a minimum in-process residence time. Accordingly, it should have rapid initial curing and be adaptable to final curing in finished or semifinished product form. Rapid, full curing could present problems of control and timing of the various steps of a continuous production process while the matrix is in a workable condition, especially if a viscous slurry is used. It appeared that a product made by a process which would permit hardening or greater part of its curing in the finished or semifinished state would be preferable.

Factors relating to reinforcements involve the composition and structure of the fabric and its distribution in the matrix as revealed in study of failure modes. The principal concern with respect to composition is largely chemical. Fabrics, such as polyesters, poly(alkylene terephthalate), and some aliphatic polyamides (nylon) are less desirable under alkaline conditions where the fabric polymer would be subject to alkaline degradation.

The distribution of the fabric in the matrix, however, is a major factor in failure which dictates its physical form. Bending and impact tests reveal that failure is initiated as large cracks in those portions of the matrix which are free of reinforcing fibers. Sandwich structures, i.e., a substantially fiber-free interior matrix between fabric-containing outer portions, performed poorly, giving sheets with large cracks on the interior. They could lose their overall integrity and would be of less value in applications such as roofing shingles. To assure distribution through the entire sheet requires internally bonded three-dimensional fabrics coextensive with the sheet. High-loft, non-woven fabrics are preferred.

The function of the ductile reinforcement is to confine the effect of applied stresses to very fine cracks, which might be considered a crack-limiting, solid-state plasticizer for the brittle matrix, although microscopically truly plastic behavior matrix never occurs.

Since the distance between discrete elements of the reinforcement can vary with numerous properties of the reinforcement, an overall method of determining the quantity of a particular reinforcement should be available. To this end, a measure called the critical fiber volume determination (Vfc) has been developed. This measure is the ratio of fabric volume to the total volume of the reinforced composite at which the tensile strength of the composite exceeds the tensile strength of the unreinforced matrix alone. Importantly, for brittle matrices reinforced with ductile fibers, it is the fiber volume ratio above which closely-spaced microcracks occur, changing a brittle material with a proclivity to large cracks of low fracture energy into a pseudo-ductile material which can be bent and absorb shocks with many microcracks. This behavior would permit bending and nailing of shingles without fracture. Generally in production of shingles, since fibers are more expensive than the matrix material, it is desirable to employ a fiber volume just above the critical ratio.

The critical fiber volume can be determined by combining successively large quantities of matrix with a fixed quantity of the fabric and bending the hardened specimens to observe below what cement loading the sheet begins to behave with pseudo-plasticity or plastically.

FIG. 1 illustrates typical load-deflection curves comparing the effect of fiber volume on bending deformation. Specimen sheets in strip form were supported at each end with successively higher loads applied at the center. Single layers of 2.3 oz./yd.$^2$ non-woven polypropylene fabric using cement loadings ranging from 0.2 lb./ft.$^2$ to 1.0 lb./ft.$^2$ were made, yielding a ratio of fiber volume to total volume ratio as indicated by numbers on the curves a through g in FIG. 1. The smooth curves at higher fabric loadings (higher fiber volume ratio values indicated on the curves) are indicative of pseudo-plastic flow resulting from microcracks. The irregular curves (probably saw-tooth since resolution was limited by data) are indicative of major crack formation. These plots reveal:

(1) initial modulus increases with decreasing fiber volume;

(2) the strain at which the matrix cracks (saw tooth plots) increases with increasing fiber volume; and (3) the curve for the lowest fiber volume, ration curve g, begins to show peaks in load-deflection curves, clearly indicating a fiber volume below the critical value. The difference in shapes between curves e and f suggest that the critical fiber volume ratio is between 0.038 and 0.040.

It should be observed that the performance indicated in curve g, the highest cement loading, could have been affected to a slight extent by the fabric being barely thick enough to be distributed through the entire thickness. As noted in the following, however, the fabric and dry cement were compacted to assure uniform distribution.

It was observed that a single layer of an open textured, very light weight, thick, high loft fabric distributed uniformly through the thickness is superior to two or more layers concentrated near the surface of the reinforced cementitious sheet. To minimize large cracks initiated near the edges of the sheet, which could result in spalling, the fabric also should be coextensive with the matrix. Further, to stabilize the relative position of fibers in the matrix, i.e., uniformity of distribution, non-woven fabrics are preferred.

An noted earlier herein, a major property of concern attributable to the chemical composition of the reinforcing fabric is its resistance to degradation by alkaline components of the matrix. Polypropylene is preferred for alkaline systems such as portland cement, while polyester may be preferred in systems such as gypsum.

In all cases the fabric had been given treatments to improve water wettability.

Another consideration in the choice of the composition for the fabric is the contribution to the final structure of the mechanical properties of the fibers constituting the fabric. Fabrics of polyester and polypropylene, containing fibers which have been drawn and heat-set (heated under tension to minimize shrinkage) have a good balance of modulus, tensile strength and ductility so that they are generally preferred. For certain specialized applications, however, the more costly aramides or pitch-based carbon fabrics of a very high modulus are useful.

Sample preparations for the tests reported herein included laying into a 10-inch by 48-inch wood mold having a ¼-inch raised perimeter strip the layers in sequence: "Saran" poly(vinylidene chloride) film, the reinforcing fabric, and they the dry matrix mix which was spread to a uniform thickness with a screed. If a second layer of fabric was used, it was laid on top of the surface of the dry matrix mix. Preliminary compaction to distribute the dry mixture through the fibrous mat was by mechanically vibrating the dry combination with a plane-surfaced handheld vibrator. Mixes were applied dry instead of wet; sprays of water containing various combinations of calcium chloride accelerator, superplasticizer, microsilica, latex, and cement pigments were then applied uniformly with a garden sprayer. Compaction with a rolling pin over a plastic release film was used after each spray application. After spraying the fabric-matrix mixture, just enough plain water was sprayed to give the surface a moist appearance under heavy rolling. The total amount of water was recorded.

Testing was conducted after three days curing at 25° C. and 100 percent R.H. in which the sheets were cut into 2×4-inch strips, the thickness measured and turned upside down for 3-point beam testing, so that the spray coatings were on the tensile side.

To achieve a uniform distribution of dry material through the reinforcement fabric so that the entire reinforced sheet will have a fiber content above the critical fiber volume ratio requires that the three-dimensional nonwoven fabric should have pores of a size sufficient for the matrix mixture or aggregate to readily be screeded or sifted through it.

A continuous backing or bottom film permits the handling of the sheet without loss of dry components and in the finished product adds the the water impermability of the structure. The film also aids in separation of cured sheets in rolls or stacks. Polyolefin, polyester, vinyl, and vinylidene chloride films are effective.

The dry-mix method described in the foregoing is especially adapted to production of the fabric-reinforced, sheet-like cementitious structure of the invention. The invention further embraces a continuous process for high-speed production with no in-process hold-up time and a short overall residence time.

Figure 2:
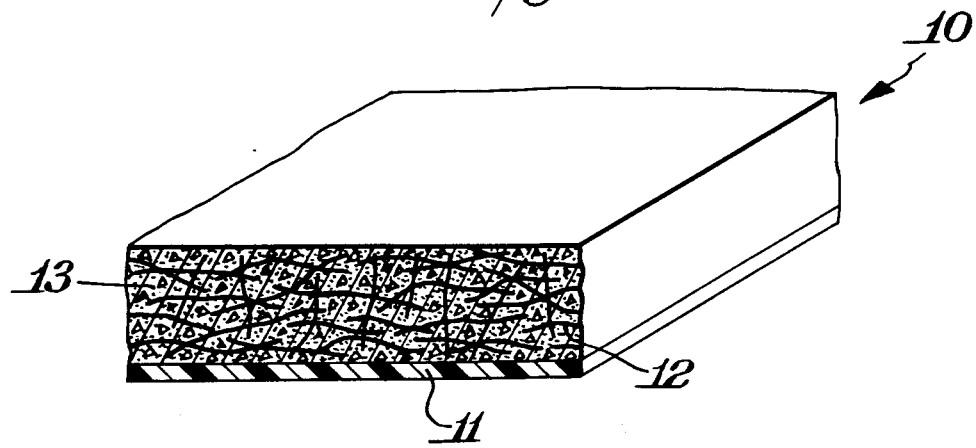
FIG. 2 is a cross-sectional illustration (not to scale) of a reinforced structure in accordance with the invention.

FIG. 2 is a cross-sectional view of the fabric-reinforced sheet-like cementitious structure 10 having film backing 11 typically a ½ mil or thicker of polyester or polypropylene. Fabric 12 is typically a 1 to 3 oz. needlepunched or high loft polypropylene if alkaline resistance is required (as for hydrating portland cement), or pitch-base carbon (for a stiffer sheet) or polyester or polyolefin (as for gypsum). Ten denier or larger fibers in fabrics usually combine adequate pore size to receive the cement-aggregate blend with sufficient volume at low cost. The use of conformable non-woven fabrics, i.e., high loft or needlepunched fabrics which are loosely entangled instead of bonded and/or staple fiber instead of continuous filament, permits doubly curved objects with small radii to be made with ease.

Matrix 13 is a water-hardenable cement with aggregate such as fly ash or fine sand into which water is sprayed. The water may contain admixtures such as calcium chloride to accelerate hardening, superplasticizers or water-soluble polymers to improve rheology and thereby improve dispersion of water throughout the dry cement blend under compactions, also microsilica or other components which tend to coat the sprayed surface to provide added hardness at the surface as well as colorants and the like.

An important feature of the present invention is that the three-dimensional fabric is so constituted and made by a process that enables it to retain its structural integrity through processes in its fabrication so that throughout the finished product the ratio of fiber volume to matrix volume is always equal to or above the critical fiber volume ratio. The process in which dry matrix material interstitially infused into the multiaxially oriented individual fibers is an important feature of the invention. This process not only assures a uniformly good product but also due to its adaptability to continuous operation, can provide a more economical product.

Figure 3:
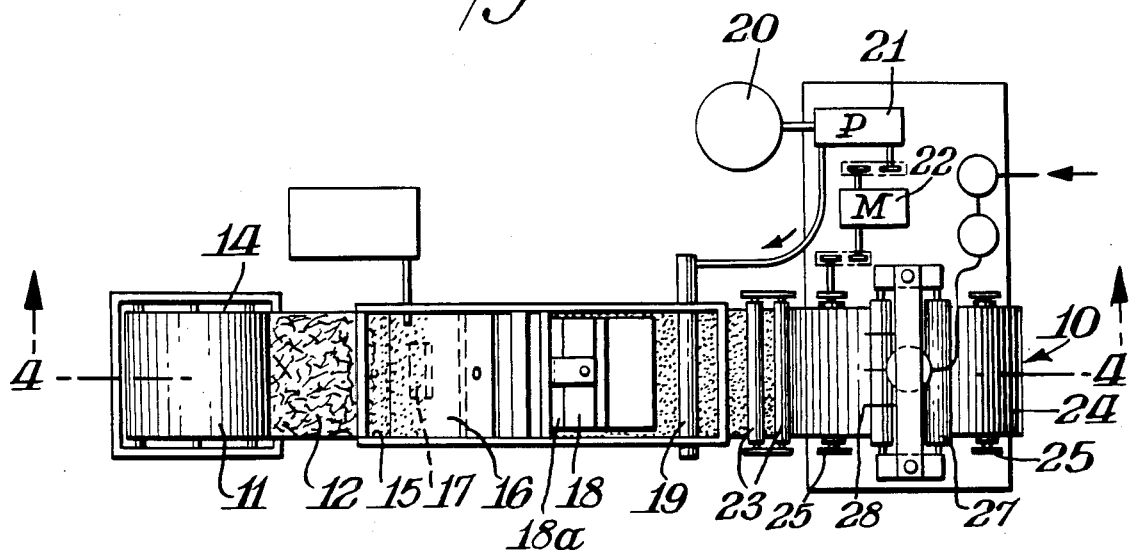
FIG. 3 illustrates, in plan view, apparatus for a process for producing reinforced structures in accordance with the present invention.
Figure 4:
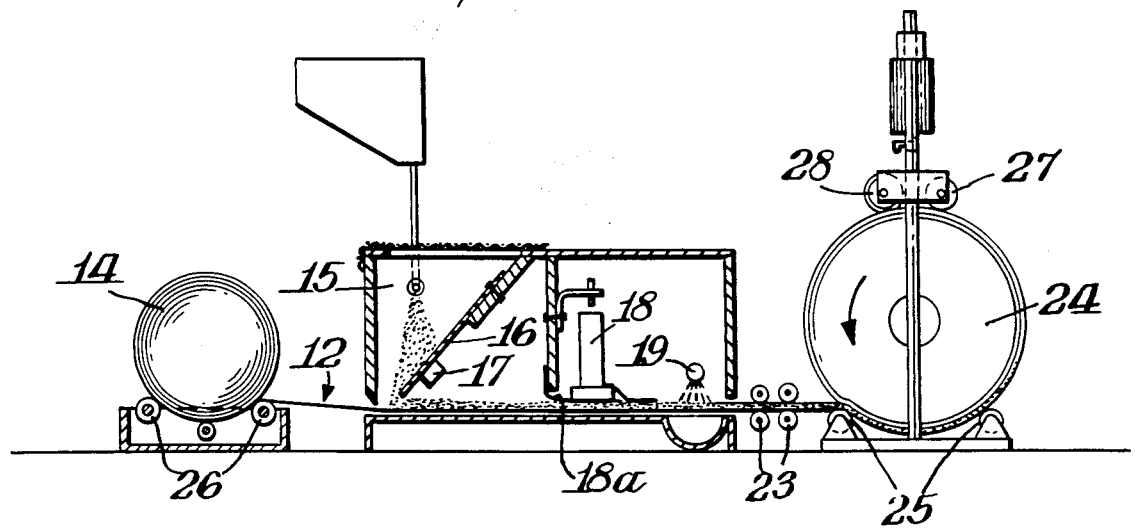
FIG. 4 illustrates in elevation view the apparatus illustrated in FIG. 3.

A schematic view of the process is illustrated in FIG. 3 and FIG. 4. Referring to these figures, a continuous-film (e.g., "Mylar" ® polyester film) backed three-dimensional fabric of polyester or polyolefin 12 is drawn from roll 14 under hopper 15 having regulating gate 16 on which is mounted small gate vibrator 17 where a controlled thickness of matrix-forming aggregate blend is deposited on film-backed fabric 12. The dry aggregate on the fabric is then passed under compacting vibrator 18 applied to drag mat 18a which assists the cement-aggregate blend in sifting into the interstices of the fabric before the dry structure passes to the next step, under spray bar 19 where water, containing any desired additive is fed from tank 20 by metering pump 21 driven by variable speed gear motor 22. After passing under the water spray, the water-wet fabric-matrix structure passes between nip rolls 23 which are urged into contact by adjustable air pressure or by a spring-loaded force to compact the structure. The structure then moves on to windup roll 24, supported by driven support rolls 25. Driving windup by support rolls 25, rather than by central axial drive simplifies control of tension on windup. Fabric supply roll 14 is preferably positioned on support rolls 26 which need not be driven. Edge trimming wheels 28 of the roll enable production of a sheet in which the fabric and the cement matrix are coextensive. This minimizes cracking and spalling caused by cement which is not reinforced.

Polypropylene fabric-reinforced sheets or laminates of 0.2 inch thickness or less which are produced and wound on cores of diameters as small as 12 inches can be unrolled flat after curing without permanent set.

The foregoing process can be modified for production of multiple rolls as for one-foot wide shingle stock, by mounting the cores of several fabric supply rolls 14 spaced apart on a common mandrel and with the windup rolls similarly mounted on their common mandrel.

The film of the lower surface serves as a means to draw the fabric, which is adhered to the film, through the process without longitudinal stretching. The bottom film also serves to keep the dry matrix mixture from sifting through the fabric and a layer-to-layer release film for the wound product.

What is claimed is:

1. A thin, sheet-like structure having:
 a cementitious matrix;
 reinforcement within the matrix consisting of a three-dimensional fabric of a ductile organic fiber distributed substantially uniformly throughout the structure at a volume ratio equal to or greater than the critical volume ratio, the pores of the fabric being sufficiently large to permit unhardened matrix to be screeded therethrough; and
 a continuous organic film adhered to at least one surface of the sheet-like structure.

2. The structure of claim 1 wherein the fabric has fibers selected from polyesters, polyolefins, aromatic polyamides, and carbon.

3. The structure of claim 1 wherein the fabric is nonwoven.

4. The structure of claim 3 wherein the fabric has fibers selected from polyester, polyolefins, aromatic polyamides, and carbon.

5. The continuous process of forming a continuous thin sheet-like structure with substantially no in-process hold-up time comprising, in sequence:
 adhering a continuous sheet of an organic backing to a continuous three-dimensional, nonwoven ductile fabric;
 applying a dry water-hardenable cementitious matrix material to the fabric layer, the organic backing preventing the material from going through the fabric layer;
 mechanically urging the matrix material into interstitial spaces of the fabric to cause the fibers to be uniformly dispersed throughout the dry layer of matrix material;
 wetting the layer of matrix material containing the fabric with a water spray; and
 thereafter allowing the water-wet structure to harden.

6. The process of claim 5 including the additional step of continuously forming the wetted structure into a roll.

7. The product of the process of claim 5.

8. The product of claim 7 in the form of a building material.

9. The product of claim 8 in the form of shingles.

10. The product of the process of claim 6 in the form of a roll.

* * * * *